US011933282B2

(12) United States Patent
Li et al.

(10) Patent No.: US 11,933,282 B2
(45) Date of Patent: Mar. 19, 2024

(54) INDUCTIVE PLASMA ACCELERATION APPARATUS AND METHOD

(71) Applicant: NATIONAL UNIVERSITY OF DEFENSE TECHNOLOGY, Hunan (CN)

(72) Inventors: Xiaokang Li, Hunan (CN); Mousen Cheng, Hunan (CN); Jianjun Wu, Hunan (CN); Bixuan Che, Hunan (CN); Moge Wang, Hunan (CN); Dawei Guo, Hunan (CN); Xiong Yang, Hunan (CN)

(73) Assignee: NATIONAL UNIVERSITY OF DEFENSE TECHNOLOGY, Hunan (CN)

( * ) Notice: Subject to any disclaimer, the term of this patent is extended or adjusted under 35 U.S.C. 154(b) by 170 days.

(21) Appl. No.: 17/605,565

(22) PCT Filed: Sep. 25, 2020

(86) PCT No.: PCT/CN2020/117682

§ 371 (c)(1),
(2) Date: Oct. 21, 2021

(87) PCT Pub. No.: WO2021/057892

PCT Pub. Date: Apr. 1, 2021

(65) Prior Publication Data

US 2022/0205438 A1 Jun. 30, 2022

(30) Foreign Application Priority Data

Sep. 25, 2019 (CN) ........................ 201910911408.7

(51) Int. Cl.
*F03H 1/00* (2006.01)

(52) U.S. Cl.
CPC ......... *F03H 1/0081* (2013.01); *F03H 1/0006* (2013.01)

(58) Field of Classification Search
None
See application file for complete search history.

(56) References Cited

U.S. PATENT DOCUMENTS 5,207,760 A * 5/1993 Dailey .................. F03H 1/0087 60/202
20,160,047 2/2016 Haque
(Continued)

FOREIGN PATENT DOCUMENTS

CN 106704133 5/2017
CN 208221007 12/2018
(Continued)

OTHER PUBLICATIONS

"International Search Report (Form PCT/ISA/210)" of PCT/CN2020/117682, with English translation thereof, dated Dec. 31, 2020, pp. 1-4.

(Continued)

*Primary Examiner* — Arun Goyal
*Assistant Examiner* — William L Breazeal
(74) *Attorney, Agent, or Firm* — JCIP GLOBAL INC.

(57) ABSTRACT

An inductive plasma acceleration apparatus, comprising a pulse laser assembly, a pulsed discharge assembly, an exciting coil assembly, a solid-state working medium, and a control assembly; the exciting coil assembly is electrically connected to the pulsed discharge assembly such that a strong pulse current is produced in the exciting coil assembly during the discharge process of the pulse discharge assembly, and an inductive pulse electromagnetic field is excited around the exciting coil assembly; the solid-state working medium is positioned on the optical path of a pulse
(Continued)

laser emitted by the pulse laser assembly such that the solid-state working medium produces a pulse gas under the ablation action of the pulse laser, and the inductive pulse electromagnetic field is positioned on the circulation gas path of the pulse gas such that the pulse gas can enter the inductive pulse electromagnetic field.

9 Claims, 4 Drawing Sheets

(56) References Cited

U.S. PATENT DOCUMENTS

| | | | | |
|---|---|---|---|---|
| 2015/0343561 | A1* | 12/2015 | Miller .................. | B23K 26/046 219/121.81 |
| 2019/0329911 | A1* | 10/2019 | Kronhaus ............. | F03H 1/0012 |

FOREIGN PATENT DOCUMENTS

| | | |
|---|---|---|
| CN | 208638771 | 3/2019 |
| CN | 110225642 | 9/2019 |
| CN | 110671287 | 1/2020 |

OTHER PUBLICATIONS

"Written Opinion of the International Searching Authority (Form PCT/ISA/237)" of PCT/CN2020/117682, dated Dec. 31, 2020, pp. 1-5.

* cited by examiner

INDUCTIVE PLASMA ACCELERATION APPARATUS AND METHOD

CROSS-REFERENCE TO RELATED APPLICATION

This application is a 371 of international application of PCT application serial no. PCT/CN2020/117682, filed on Sep. 25, 2020, which claims the priority benefits of China application no. 201910911408.7, filed on Sep. 25, 2019. The entirety of each of the above-mentioned patent applications is hereby incorporated by reference herein and made a part of this specification.

TECHNICAL FIELD

The invention relates to the technical field of electric propulsion, and in particular, relates to an inductive plasma acceleration apparatus and method.

DESCRIPTION OF RELATED ART

In many engineering application scenarios, it is necessary to generate and accelerate plasmas. Typical applications are involved in fields such as plasma spraying and surface processing, or in propulsion systems in the aerospace field.

In the aerospace field, a propulsion device as a part for supplying power is extremely important for a spacecraft, and acts as the basis for the spacecraft to complete a mission. Compared with the traditional chemical propulsion, the electric propulsion accelerates a propellant by using electric energy to acquire thrust, with a propelling energy derived from something other than the propellant, thereby acquiring a higher injection velocity. As a result, the consumption of the propellant can be effectively reduced, and the effective load of the spacecraft can be increased. At present, the electric propulsion technology has been widely applied in spacecrafts, and more than half of high-orbit communication satellites have been equipped with electric propulsion systems, which have become one of the signs indicating the advancement of a satellite platform.

In electric propulsion, there emerges a type of propulsion device which accelerates plasmas by using electromagnetic forces. This is one of the important categories of electric propulsion and is also an international research hotspot in recent years. Its working principle is as follows: a working medium is ionized depending on electric energy to acquire plasmas, which are further accelerated depending on electromagnetic forces to reach a tremendous speed and then be injected outwards; and meanwhile, the injected plasmas would produce a reverse thrust or an impulse to the device per se based on the principle of action and reaction.

A traditional plasma acceleration apparatus, such as a pulsed plasma thruster (PPT), generates the plasmas in a manner that substantially belongs to inter-electrode discharge. Therefore, a discharge electrode is required as a necessary component. When the PPT is working, a spark plug performs trace discharging to initiate primary discharging between two parallel-sheet electrodes, whereby a larger discharge current is produced to establish a self-inductive magnetic field; and meanwhile, a layer of solid working medium is ablated and peeled off to further form plasmas. A plasma current interacts with the magnetic field to generate a Lorentz force to accelerate plasma injection, thereby generating a pulse of thrust. Due to the existence of electrodes, such a propulsion device inevitably has problems such as shorted lifetime, plasma component contamination, and poor working-medium compatibility due to electrode ablation, such that the practical application of the propulsion device is further restricted to a certain extent.

Based on the above reasons, researchers have proposed an electrodeless pulses inductive plasma thruster (also known as an inductive pulsed plasma thruster) using a gaseous working medium. Such a device ionizes and accelerates a working medium based on the principle of pulsed induction discharge and the principle of inductive eddy-current repulsion, where a gas is used as the working medium and is controlled by a pulse gas valve. When this device works, there are two stages. In the first stage, a pulse gas supply valve in the upstream of an injector is quickly opened to inject a working-medium gas to the surface of an exciting coil bank by a tower injector; the pulse gas valve is rapidly closed after a specified gas mass is achieved; and the working-medium gas moves and spreads out along the surface of the exciting coil bank until a desired gas distribution is achieved. In the second stage, an energy-stage capacitor is triggered to discharge for generating a strong pulse current in the exciting coil bank; the pulsed current passes through an inductive pulse electromagnetic field excited by the exciting coil bank, with a circumferential electric-field component breaking down the gas to establish an annular plasma current, and a radial magnetic-field component interacting with the plasma current to produce an axial Lorentz force to accelerate the plasmas, thereby generating thrust to complete one operating pulse. When a plurality of operating pulses work at a certain repetition frequency, the device can achieve a continuous propulsion effect.

From the description above, it can be seen that the existing pulsed inductive plasma thruster using the gaseous working medium realizes pulse gas supply by opening and closing the pulse gas valve at high speed; if the valve is opened and closed too slowly, the pulsed discharge has not yet started or has been completed when part of the gas reaches the exciting coil, and then a large amount of working medium would be wasted due to dissipation. This is unacceptable for aerospace application scenarios where the working medium is very precious. Therefore, the thruster puts forward an extremely high requirement on a pulse gas supply subsystem, the valve of which is highly demanded in terms of delay time, opening time, and closing time, and the opening time and the closing time need to be as short as a hundred microseconds or even tens of microseconds. Beyond that, the existing pulsed inductive plasma thruster based on a high-speed pulse gas valve still has problems in the following aspects:

1. Lifetime. The thruster works in the form of repetition frequency, the valve needs to be opened and closed at an extremely high speed in each pulse, and moving components necessarily withstand a great force. Therefore, the lifetime of the valve has become a bottleneck problem of the entire device. Taking the typical situations of various core components in the United States as an example, the life of a discharge capacitor may reach 107 times, a discharge switch may reach 105 times, but the life of a typical pulse gas valve is only 103 times, which greatly restricts the actual application of such devices.
2. Power Consumption. A spool of the valve is switched among a static state, a high-speed motion state and a static state at high speed, a large part of energy will eventually be lost during the braking of the spool. Therefore, a higher additional power is needed to drive the valve to work. This leads to reduced system efficiency and also results in problems in heat dissipation, system complexity and the like.

3. Interference. A drive device of the valve and a drive circuit of the exciting coil bank are electrically connected, which may lead to mutual interferences therebetween and even lead to valve malfunction. This is not allowed in the actual work where time sequences need to be closely coordinated.

SUMMARY

In view of the shortcomings in the supply of the working medium in a inductive pulsed plasma acceleration apparatus using the gaseous working medium in the prior art, the invention provides an inductive plasma acceleration apparatus and method. By innovating the manner of supplying a working medium, a design is made in combination with the whole propulsion apparatus, the bottleneck problem on the lifetime of the working medium in use is solved, and the objects of efficiently utilizing the working medium, bringing the advantages of such a propelling apparatus into full play, and promoting the practical applicability of various apparatuses are achieved.

In order to achieve the above objects, the present invention provides an inductive plasma acceleration apparatus, comprising a pulse laser assembly, a pulsed discharge assembly, an exciting coil assembly, a solid state working medium, and a control assembly;

the exciting coil assembly is electrically connected to the pulsed discharge assembly, such that the pulsed discharge assembly produces a strong pulse current in the exciting coil assembly during a discharge process to further excite an inductive pulse electromagnetic field around the exciting coil assembly;

the solid-state working medium is located on an optical path of a pulse laser emitted by the pulse laser assembly, such that the solid-state working medium produces a pulse gas under an ablation action of the pulse laser, and the inductive pulse electromagnetic field is located on a circulation gas path of the pulse gas, such that the pulse gas is capable of entering the inductive pulse electromagnetic field; and the pulse laser assembly and the pulsed discharge assembly are both electrically connected to the control assembly to control the power and frequency of the pulse laser emitted by the pulse laser assembly.

Further preferred, a reflecting assembly capable of changing a direction of the optical path is disposed on the optical path of the pulse laser emitted by the pulse laser assembly, such that the laser is capable of accurately irradiating on the solid-state working medium based on a predetermined density distribution.

Further preferred, further comprising a bracket, the reflecting assembly comprises a first reflecting mirror and a second reflecting mirror which are disposed on the bracket, the first reflecting mirror has an axisymmetric conical configuration, and the second reflecting mirror has an axisymmetric annular configuration;

the first reflecting mirror is located within an annular opening of the second reflecting mirror, a reflecting sheet of the first reflecting mirror is located on a conical surface of the conical configuration, and a reflecting surface of the second reflecting mirror is located on an inner-ring surface of the annular configuration;

the solid-state working medium and the exciting coil assembly are both disposed on the bracket and located between a reflecting surface of the first reflecting mirror and the reflecting surface of the second reflecting mirror, and the exciting coil assembly is located below the solid-state working medium and excites the inductive pulse electromagnetic field above the solid-state working medium;

the pulse laser emitted by the pulse laser assembly irradiates on the solid-state working medium after passing the reflecting surface of the first reflecting mirror and the reflecting surface of the second reflecting mirror.

Further preferred, a generatrix of the first reflecting mirror and a generatrix of the second reflecting mirror are of a linear or curved configuration.

Further preferred, further comprising a bracket assembly, which comprises a support pedestal and a tower disposed on the support pedestal, wherein the exciting coil assembly is disposed on the support pedestal and coiled around the tower;

the solid-state working medium has a columnar structure, with one end butted and connected to the support pedestal and the other end located inside the tower, and a portion of the solid-state working medium located within the tower has an outer wall that is in contact with and connected to an inner wall of the tower;

the reflecting assembly comprises a reflecting pedestal suspended above the tower, as well as a third reflecting mirror and a lens which are disposed on the reflecting pedestal, the third reflecting mirror is located above the lens and has a reflecting surface facing towards the lens, an annular skirt extending downwards is disposed around the lens, the lens is located directly above the tower and faces towards an end of the solid-state working medium, and an annular nozzle facing towards the exciting coil assembly is defined between an inner wall of the annular skirt and an outer wall of the tower;

the pulse laser emitted by the pulse laser assembly irradiates on an end of the solid-state working medium after passing the reflecting surface of the third reflecting mirror and the lens.

Further preferred, the support pedestal is provided with a restraint member having an annular structure, and the exciting coil assembly is located between an inner wall of the restraint member and the outer wall of the tower.

Further preferred, the support pedestal is provided with a support spring at a position corresponding to the solid-state working medium, and the end of the solid-state working medium is butted and connected to the support spring.

Further preferred, the exciting coil assembly is formed by axisymmetrically crossing and overlapping a plurality of spiral line type antennas.

Further preferred, the solid-state working medium is made of a high polymer material or a metal material.

In order to achieve the above objects, the present invention also provides an inductive plasma acceleration method using the above inductive plasma acceleration apparatus, specifically comprising the following steps:

ablating the solid-state working medium by the pulse laser to produce a pulse gaseous ablation product, namely a pulse gas flow;

breaking down the gaseous ablation product by a circumferential electromagnetic-field component of the inductive pulse electromagnetic field and establishing an annular plasma current;

interacting with the plasma current by a radial electromagnetic-field component of the inductive pulse electromagnetic field to produce an axial Lorentz force to accelerate the plasmas, thereby achieving a propelling effect, wherein the yield and pulse frequency of the pulse gaseous ablation product is controlled by controlling the power and frequency of the pulse laser.

The invention has the following beneficial technical effects.

(1) The inductive plasma acceleration apparatus according to the invention supplies a working medium based on the pulse laser which ablates a solid-state working medium; and implements the ionization and acceleration of the plasmas based on the principle of pulsed induction discharging and the principle of inductive eddy-current repulsion. Compared with the solution based on the pulse gas valve in the prior art, components that need to move at high speed do not exist; there is no need to brake a high-speed spool; and the pulse frequency of a pulse gas flow generated by ablating the solid-state working medium is controlled by adjusting a pulse period of the pulse laser, instead of forming the pulse frequency of the pulse gas flow by controlling the gas flow with the pulse gas flow valve in the prior art. For pulse laser assemblies, the period of the pulse laser can be controlled simply from the circuit, instead of making high-frequency mechanical actions like that of the pulse gas flow valve, which addresses the bottleneck problem on lifetime and increases the system efficiency.

(2) Due to the use of the solid-state working medium in the inductive plasma acceleration apparatus according to the invention, components such as working-medium tanks, pipes, and valve are omitted, which effectively reduces the system complexity.

(3) Due to the photoelectric decoupling implemented between a working medium supply portion consisting of the pulse laser assembly and the solid-state working medium and a strong discharging portion consisting of the pulsed discharge assembly and the exciting coil assembly in the inductive plasma acceleration apparatus according to the invention, the mutual crosstalk and malfunction between the working-medium supply part and the primary discharge part are greatly reduced.

(4) The inductive plasma acceleration apparatus according to the invention has an electrodeless structure, such that an electrode ablation problem that affects various electromagnetic thrusters does not exist; the apparatus has an excellent long-life operating potential and a high-power load capacity, does not require an additional magnetic field, and has a simple structure due to a single-stage discharge process; meanwhile, the apparatus works in a pulsed manner, and can adjust the average thrust and power flexibility by changing the pulse frequency, thereby achieving a better application prospect in the field of space propelling.

BRIEF DESCRIPTION OF THE DRAWINGS

To describe the technical solutions in the embodiments of the invention or in the prior art more clearly, the following briefly introduces the accompanying drawings to be used in the descriptions of the embodiments or the prior art. Obviously, the accompanying drawings in the following description show merely some embodiments of the invention, and a person of ordinary skill in the art may still derive other drawings from these accompanying drawings without creative efforts.

Figure 1:
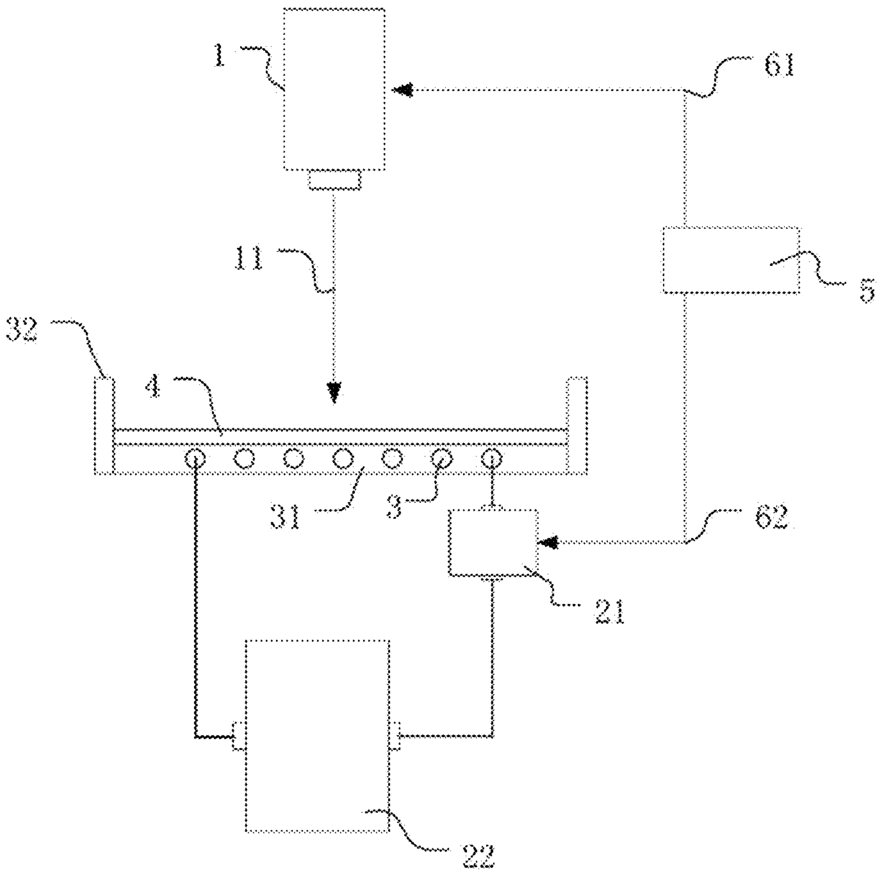
FIG. 1 is a schematic diagram of a first implemented structure of an inductive plasma acceleration apparatus according to an embodiment of the invention.

Reference signs are illustrated as follows: 1, pulse laser assembly; 11, pulse laser; 21, pulse switch; 22, energy-storage capacitor; 3, exciting coil assembly; 31, coil slot; 32, restraint member; 4, solid-state working medium; 5, control assembly; 61, first control signal; 62, second control signal; 71, bracket; 72, support pedestal; 73, tower; 74, support spring; 81, first reflecting mirror; 82, second reflecting mirror; 83, third reflecting mirror; 84, lens; 85, reflecting pedestal; and 86, annular skirt.

The object achievement, functional characteristics, and advantages of the invention will be further illustrated in combination with embodiments and with reference to the accompanying drawings.

DESCRIPTION OF THE EMBODIMENTS

The technical solutions in the embodiments of the invention will be described clearly and completely below in conjunction with the accompanying drawings in the embodiments of the invention. Obviously, the embodiments described are merely some instead of all of the embodiments of the invention. Based on the embodiments of the invention, every other embodiment obtained by a person of ordinary skills in the art without making creative efforts shall fall within the protection scope of the invention.

It should be noted that all directional indications (such as, up, down, left, right, front, back, . . . ) in the embodiments of the invention only serve to explain a relative positional relationship, a motion condition and the like between various components under a specific posture (as shown in the accompanying drawings). If the specific posture changes, the directional indications change therewith accordingly.

In addition, the descriptions such as "first" and "second" involved in the embodiments of the invention are merely for a descriptive purpose, and shall not be construed as indicating or implying their relative importance or implicitly indicating the number of technical features indicated. As such, features defined by "first" and "second" can explicitly or implicitly include at least one of said features. In the description of the invention, unless otherwise clearly specified, "a plurality of" means at least two, for example, two, three, etc.

In the invention, unless otherwise expressly specified and defined, the terms "connection", "fixation", and the like should be understood in a broad sense. For example, the "fixation" may be a fixed connection, or a detachable connection or an integral connection; may be a mechanical connection, or an electrical connection, or a physical connection or wireless communication connection; may be a direct connection, or an indirect connection via an intermediate medium, or an internal connection between two elements, or an interaction relationship between two elements. For those of ordinary skills in the art, the specific meanings of the above terms in the invention can be understood in accordance with specific conditions.

In addition, the technical solutions of various embodiments of the invention can be combined with each other, which must be based on the fact that it is implementable for those skilled in the art. When the technical solutions are in conflict during the combining or the combination is not achievable, it should be considered that such a combination does not exist and is not within the protection scope claimed by the invention.

Embodiment 1

FIG. 1 shows a first implemented structure of an inductive plasma acceleration apparatus according to an embodiment of the invention. The apparatus includes the following assemblies.

A pulse laser assembly 1 is configured to generate pulse laser 11. In this embodiment, a pulse laser apparatus or another apparatus capable of emitting the pulse laser is used as the pulse laser assembly 1.

A pulsed discharge assembly consists of a pulse switch 21 and an energy-storage capacitor 22 which are electrically connected, and is configured to perform pulsed discharge. Here, a high-peak-current pulse switch 21 or a switch array is used as the pulse switch 21; and a high-voltage end of the pulse switch 21 is integrally encapsulated with a high-temperature-resistant epoxy resin to increase its insulating property during the use in a near-vacuum environment. The energy-storage capacitor 22 is configured to store discharge energy, and a wiring terminal of the energy-storage capacitor 22 has an encapsulated structure to increase the insulating property and airtightness during the use in a vacuum environment. The number of the energy-storage capacitor 22 is one or more, and when there are a plurality of energy-storage capacitors 22, all the capacitors tightly surrounds the pulse switch 21 spatially in an axisymmetric manner.

Figure 2:
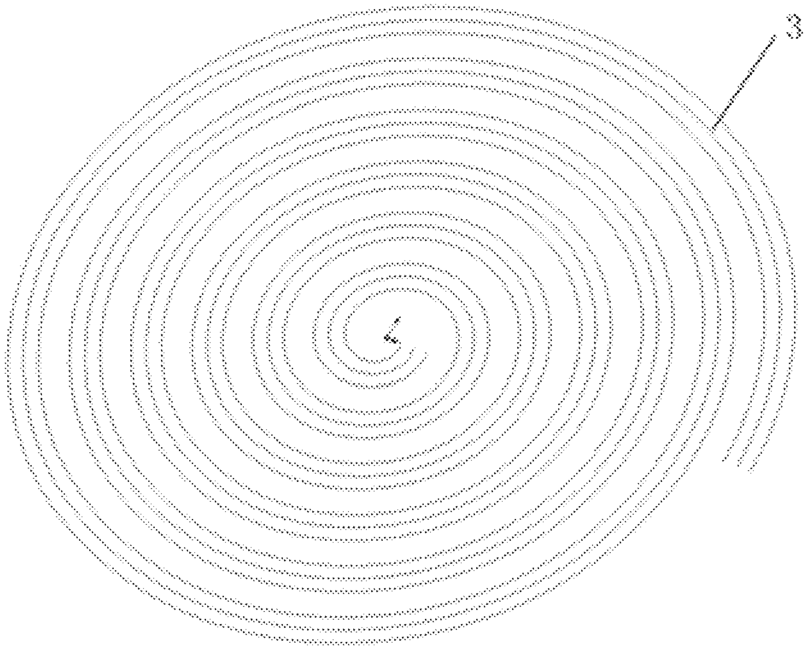
FIG. 2 is a schematic structural diagram of an exciting coil assembly in the first implemented structure of the inductive plasma acceleration apparatus according to an embodiment of the invention.

The exciting coil assembly 3 is formed by crossing and overlapping a plurality of spiral line type antennas in an axisymmetric manner, as shown in FIG. 2. The exciting coil assembly 3 may also be represented in other forms, which will not be described one by one in detail in this embodiment. The exciting coil assembly 3 is arranged in a coil slot 31, which is made of an insulating material. The exciting coil assembly 3 is electrically connected to the pulse switch 21 and the energy-storage capacitor 22 to form a complete electric loop, such that the pulsed discharge assembly produces a strong pulse current in the exciting coil assembly 3, thereby further exciting an inductive pulse electromagnetic field around the exciting coil assembly 3. Here, when the exciting coil assembly 3 is electrically connected to the pulse switch 21 and the energy-storage capacitor 22 to form a complete electric loop, one pole of each energy-storage capacitor 22 is connected in series to one end of a single spiral line type antenna, the other end of which is then connected to one end of the pulse switch 21; and the other pole of the energy-storage capacitor 22 is directly connected to the other end of the pulse switch 21.

A solid-state working medium 4 is made of a high polymer material or a metal material, and is arranged on the exciting coil assembly 3 and located on an optical path of a pulse laser 11 emitted by the pulse laser assembly 1, such that the solid-state working medium 4 produces a pulse gas under an ablation action of the pulse laser 11, and meanwhile, the pulse gas produced from the solid-state working medium 4 ablated by the laser is capable of entering the inductive pulse electromagnetic field.

A control assembly 5 is electrically connected to the exciting coil assembly 3 and the pulsed discharge assembly and is configured to control the on and off of the pulse laser assembly 1 and the pulse switch 21, and a PLC control box or an electrical control box or a signal generator may be used as the control assembly 5. In this embodiment, a signal generator common in the market is used as the control assembly 5, where the signal generator is set to generate two trigger pulses to control the operation of the pulse laser assembly 1 and the pulse switch 21, so as to achieve the effect of coordinating the work between the pulse laser assembly 1 and the pulsed discharge assembly. Further, the two trigger pulses works repetitively at a certain frequency to achieve the effect of controlling the magnitude of the thrust.

Preferably, a restraint member 32 having an annular structure is disposed around the exciting coil assembly 3, and the solid-state working medium 4 is located within an annular opening of the restraint member 32 to prevent a pulse gas generated by the solid-state working medium 4 ablated by the laser from escaping from an edge of the exciting coil assembly 3.

In such a structure, the inductive plasma acceleration apparatus works in the following process: the control assembly 5 emits a first control signal 61 to activate the pulse laser assembly 1, which emits a beam of laser to ablate the solid-state working medium 4 to produce a gaseous ablation product in the form of a pulse gas, and the pulse gas moves to a position, nearby the exciting coil assembly 3, where the pulse gas may be subjected to the action of the inductive pulse electromagnetic field, i.e., directly above the exciting coil assembly 3; at this point, the control assembly 5 emits a second control signal 62 to turn on the pulse switch 21, thereby turning on the loop consisting of the pulse switch 21, the energy-storage capacitor 22 that has been charged to a preset high voltage, and the exciting coil assembly 3, here, the pulse frequency of the pulse switch 21 is the same as that of the pulse laser assembly 1 for pulsed discharge; and the strong pulse current is produced by discharging and excited by the exciting coil assembly 3 to generate an inductive pulse electromagnetic field, which has a circumferential electric-field component breaking down the pulse gas to establish an annular plasma current, and has a radial magnetic-field component interacting with the plasma current to produce an axial Lorentz force to accelerate the plasmas, thereby achieving a propelling effect to complete one working pulse. Here, the average thrust and the average power may be adjusted by adjusting the working frequency of the pulse laser assembly 1 and the pulse switch 21.

Embodiment 2

Figure 3:
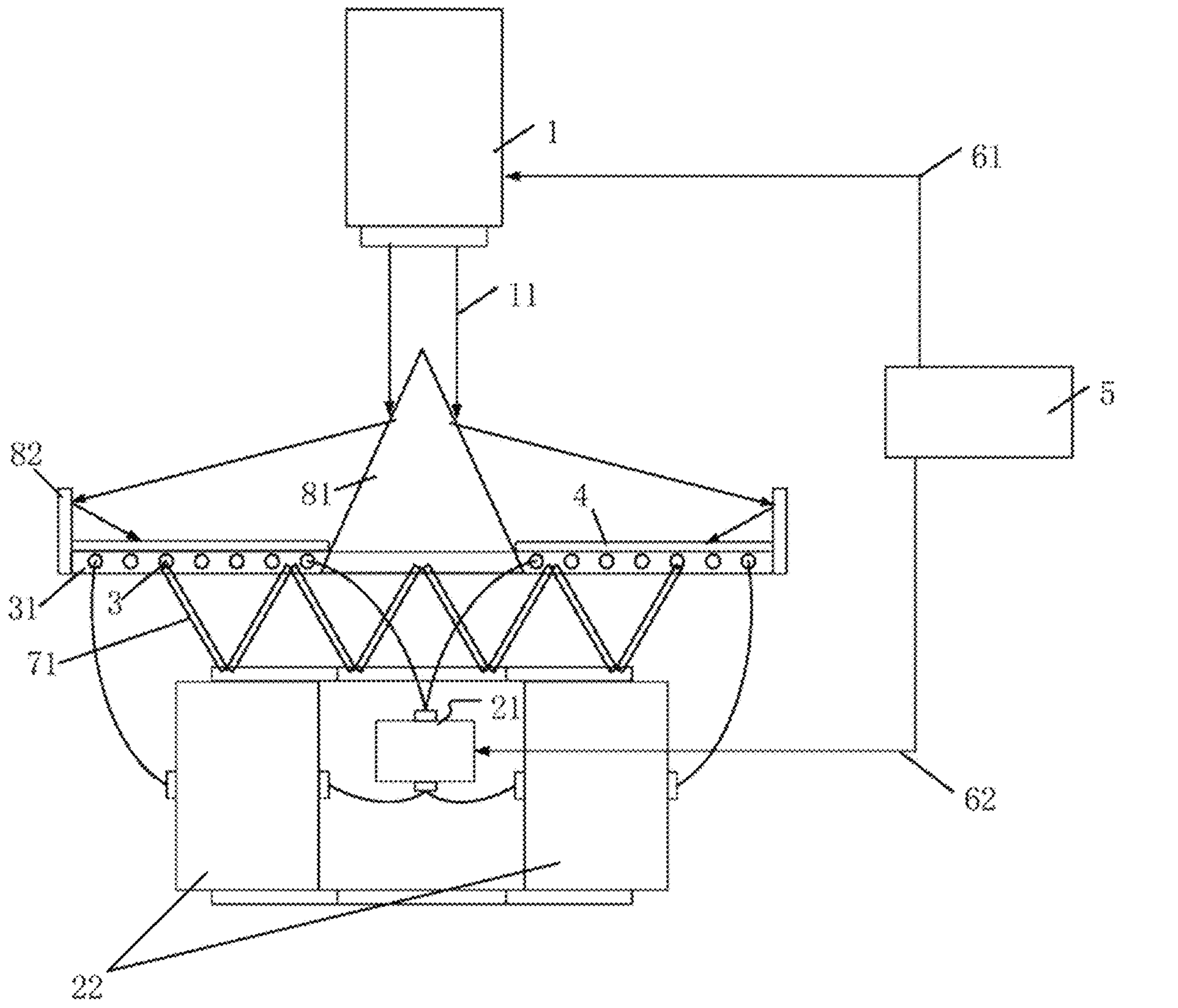
FIG. 3 is a schematic diagram of a second implemented structure of an inductive plasma acceleration apparatus according to an embodiment of the invention.

FIG. 3 shows a second implemented structure of an inductive plasma acceleration apparatus in this embodiment.

Figure 4:
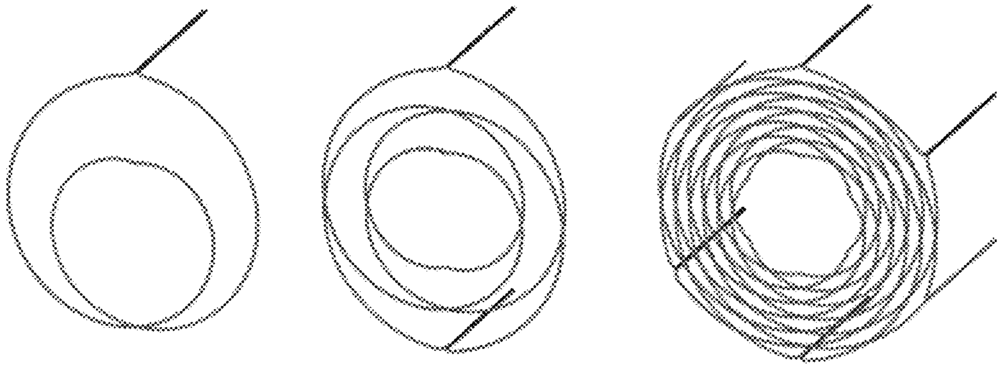
FIG. 4 is a schematic structural diagram of an exciting coil assembly in the second implemented structure of the inductive plasma acceleration apparatus according to an embodiment of the invention.

The apparatus includes a pulse laser assembly 1, a pulsed discharge assembly, an exciting coil assembly 3, a solid-state working medium 4, and a control assembly 5, all of which are the same as those in the first implemented structure in function and composition. The apparatus further includes a reflecting assembly, which is disposed on an optical path of the pulse laser 11 emitted by the pulse laser assembly 1 to allow the laser to irradiate on the solid-state working medium 4 based on a predetermined intensity distribution. Compared with the first implemented structure, the second implemented structure is different in that the exciting coil assembly 3 is formed by crossing and overlapping a plurality of spiral line type antennas in an axisymmetric manner. Preferably, the single spiral line type antenna is specifically of an Archimedes spiral line type, i.e., the single spiral line type antenna and an exciting coil assembly 3 consisting of two and 6 spiral line type antennas as shown in FIG. 4 from left to right. The exciting coil assembly 3 may also be represented in other forms, which will not be described one by one in detail in this embodiment.

In this implemented structure, the inductive plasma acceleration apparatus further includes a bracket 71, on which the pulsed discharge assembly, the exciting coil assembly 3, the solid-state working medium 4, and the reflecting assembly are installed, and the pulse laser assembly 1 and the control assembly 5 are installed at positions on or beyond the bracket 71.

In this implemented structure, the solid-state working medium 4 has an annular sheet structure; the reflecting assembly includes a first reflecting mirror 81 and a second reflecting mirror 82, which are detachably installed on a bracket 71, the first reflecting mirror 81 has an axisymmetric conical configuration, and the second reflecting mirror 82 has an axisymmetric annular configuration; and the first reflecting mirror 81 is located within the annular opening of the second reflecting mirror 82, a reflecting sheet of the first reflecting mirror 81 is located on a conical surface of the conical configuration, and a reflecting surface of the second reflecting mirror 82 is located on an inner-ring surface of the annular configuration.

The solid-state working medium 4 and the exciting coil assembly 3 are both disposed on the bracket 71 and located between a reflecting surface of the first reflecting mirror 81 and the reflecting surface of the second reflecting mirror 82, that is, the first reflecting mirror 81 is located within the annular opening of the solid-state working medium. Preferably, a conical axis of the first reflecting mirror 81, an annular axis of the solid-state working medium 4, and an annular axis of the second reflecting mirror 82 are overlapped. The exciting coil assembly 3 is located below the solid-state working medium 4 and excites the inductive pulse electromagnetic field above the solid-state working medium. Specifically, a coil slot 31 of an annular structure is installed on the bracket; the exciting coil assembly 3 is arranged in the coil slot 31; the solid-state working medium 4 is laid on the coil slot 31; the first reflecting mirror 81 is installed at an inner ring position on the coil slot; and the second reflecting mirror 82 is installed at an outer ring position on the coil slot 31.

In this implemented structure, the pulse laser 11 emitted by the pulse laser assembly 1 irradiates on the solid-state working medium 4 after passing the reflecting surface of the first reflecting mirror 81 and the reflecting surface of the second reflecting mirror 82. Preferably, a center of the pulse laser 11 emitted by the pulse laser assembly 1 is overlapped with the conical axis of the first reflecting mirror 81, such that the pulse laser 11 of a linear configuration emitted by the pulse laser assembly 1 changes into a laser surface of an annular configuration after passing the reflecting surface of the first reflecting mirror 81, and then radiates an annular region on the solid-state working medium 4 after passing the reflecting surface of the second reflecting mirror 82, thereby allowing the pulse laser 11 to accurately radiate the solid-state working medium 4 based on the predetermined intensity distribution.

Preferably, a generatrix of the first reflecting mirror 81 and a generatrix of the second reflecting mirror 82 are each of a linear configuration or a curved configuration, and the generatrix of the first reflecting mirror 81 of a different generatrix configuration and the second reflecting mirror 82 of a different generatrix configuration may be changed to achieve the effect of changing a radiating area and position of the pulse laser 11 on the solid-state working medium 4.

Figure 5:
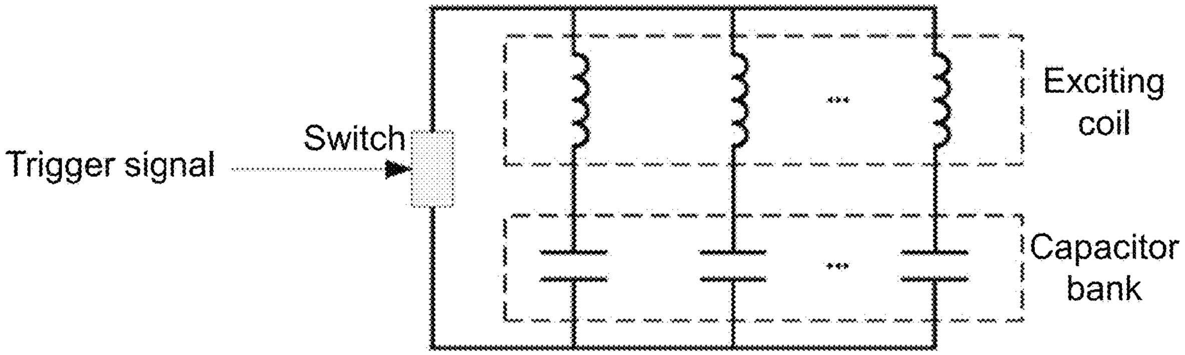
FIG. 5 is a circuit diagram of a pulse switch, an energy storage capacitor bank, and an exciting coil assembly for exciting an inductive pulse electromagnetic field in the second implemented structure of the inductive plasma acceleration apparatus according to an embodiment of the invention.

In such a structure, the inductive plasma acceleration apparatus works in the following process: the control assembly 5 emits a first control signal 61 to activate the pulse laser assembly 1, which emits a pulse laser 11, the pulse laser 11 of a linear configuration ablates an annular region on the solid-state working medium 4 after passing the reflecting surface of the first reflecting mirror 81 and the reflecting surface of the second reflecting mirror 82, to produce a gaseous ablation product in the form of a pulse gas, and the pulse gas subsequently moves to a position, nearby the exciting coil assembly 3, where the pulse gas may be subjected to the action of the inductive pulse electromagnetic field, i.e., directly above the exciting coil assembly 3, here, the second reflecting mirror 82 acts as the restraint member 32 to prevent the pulse gas produced by the solid-state working medium 4 ablated by the laser from escaping from the edge of the exciting coil assembly 3; at this point, the control assembly 5 emits a second control signal 62 to turn on the pulse switch 21, thereby turning on the loop consisting of the pulse switch 21, the energy-storage capacitor 22 that has been charged to a preset high voltage, and the exciting coil assembly 3, here, the pulse frequency of the pulse switch 21 is the same as that of the pulse laser assembly 1 for pulsed discharge; and the strong pulse current is produced by discharging and excited by the exciting coil assembly 3 to generate an inductive pulse electromagnetic field, which has a circumferential electric-field component breaking down the pulse gas to establish an annular plasma current, and has a radial magnetic-field component interacting with the plasma current to produce an axial Lorentz force to accelerate the plasmas, thereby achieving a propelling effect to complete one working pulse. Here, the average thrust and the average power may be adjusted by adjusting the working frequency of the pulse laser assembly 1 and the pulse switch 21. Here, a circuit diagram of the pulse switch 21, the energy-storage capacitor bank, and the exciting coil assembly 3 for exciting the inductive pulse electromagnetic field is as shown in FIG. 5.

Embodiment 3

Figure 6:
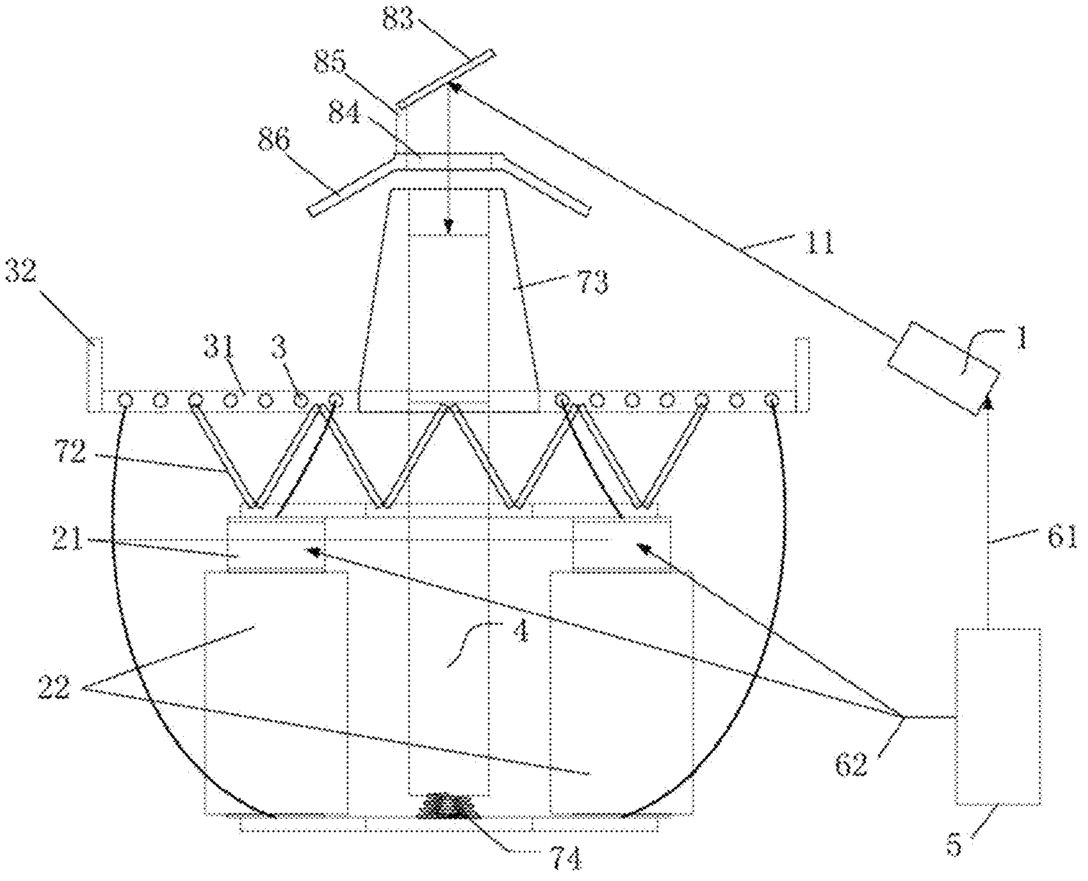
FIG. 6 is a schematic diagram of a third implemented structure of an inductive plasma acceleration apparatus according to an embodiment of the invention.

FIG. 6 shows a third implemented structure of an inductive plasma acceleration apparatus in this embodiment. The apparatus includes a pulse laser assembly 1, a pulsed discharge assembly, an exciting coil assembly 3, a solid-state working medium 4, and a control assembly 5, all of which are the same as those in the first implemented structure in function and composition. The apparatus further includes a reflecting assembly, which is disposed on an optical path of the pulse laser 11 emitted by the pulse laser assembly 1 to allow the laser to irradiate on the solid-state working medium 4 accurately and uniformly. Here, the exciting coil assembly 3 in the third implemented structure has a specific implemented structure the same as that in the second implemented structure.

The inductive plasma acceleration apparatus further includes a bracket assembly, which includes a support pedestal 72 and a tower 73 disposed on the support pedestal 72; the exciting coil assembly 3 is disposed on the support pedestal 72 and coiled around the tower 73. Specifically, the support pedestal 72 is provided with a coil slot 31 of an annular structure; the coil slot 31 is sleeved on a bottom end of the tower 73; the exciting coil assembly 3 is arranged in the coil slot 31. The pulsed discharge assembly and the solid-state working medium 4 are both installed on the bracket assembly; and the reflecting assembly, the pulse laser assembly 1 and the control assembly 5 are installed at positions on or beyond the bracket 71. In this implemented structure, the solid-state working medium 4 has a columnar structure, with a bottom end butted and connected onto the support pedestal 72 and a top end located within the tower 73, and a portion of the solid-state working medium 4 located within the tower 73 has an outer wall that is in contact with and connected to an inner wall of the tower 73; the reflecting assembly includes a reflecting pedestal 85 suspended above the tower 73, as well as a third reflecting mirror 83 and a lens 84 which are disposed on the reflecting pedestal 85, and in this implemented structure, the reflecting assembly is connected onto the support pedestal 72 through a mounting rack not shown; the third reflecting mirror 83 is located above the lens 84 and has a reflecting surface facing towards the lens 84, an annular skirt 86 extending downwards is disposed around the lens 84, and the lens 84 and the annular skirt 86 form a hood-like structure covering downwards; and the lens 84 is located directly above the tower 73 and faces towards an end of the solid-state working medium 4, and an annular nozzle facing towards the exciting coil assembly 3 is defined between an inner wall of the annular skirt 86 and an outer wall of the tower 73.

The pulse laser 11 emitted by the pulse laser assembly 1 irradiates on the end of the solid-state working medium after passing the reflecting surface of the third reflecting mirror 83 and the lens 84. Specifically, the pulse laser 11 emitted by the pulse laser assembly 1 passes by the reflecting surface of the third reflecting mirror 83, then vertically penetrates through the lens 84, and then vertically radiating the end of the solid-state working medium 4. In this implemented structure, the lens 84 is detachably installed on an emission pedestal via a detachable connection which may be a threaded connection or a fastener connection. The lens 84 may be a focusing lens or an extender lens. When the solid-state working medium 4 is fine, the focusing lens is used as the lens 84 in this embodiment; and when the solid-state working medium 4 is coarse, the extender lens is used as the lens 84 in this embodiment.

Preferably, the support pedestal 72 is provided with a restraint member 32 having an annular structure; the exciting coil assembly 3 is located between the inner all of the annular restraint member 32 and the outer wall of the tower 73 to prevent a pulse gas generated by the solid-state working medium 4 ablated by the laser from escaping from the edge of the exciting coil assembly 3.

Preferably, the support pedestal 72 is provided with a support spring 74 at a position corresponding to the solid-state working medium 4, and the end of the solid-state working medium 4 is butted and connected to the support spring 74. The support spring 74 plays a certain damping role to prevent the solid-state working medium of the columnar structure from being damaged by external forces when the inductive plasma acceleration apparatus moves along with a carrier.

Figure 7:
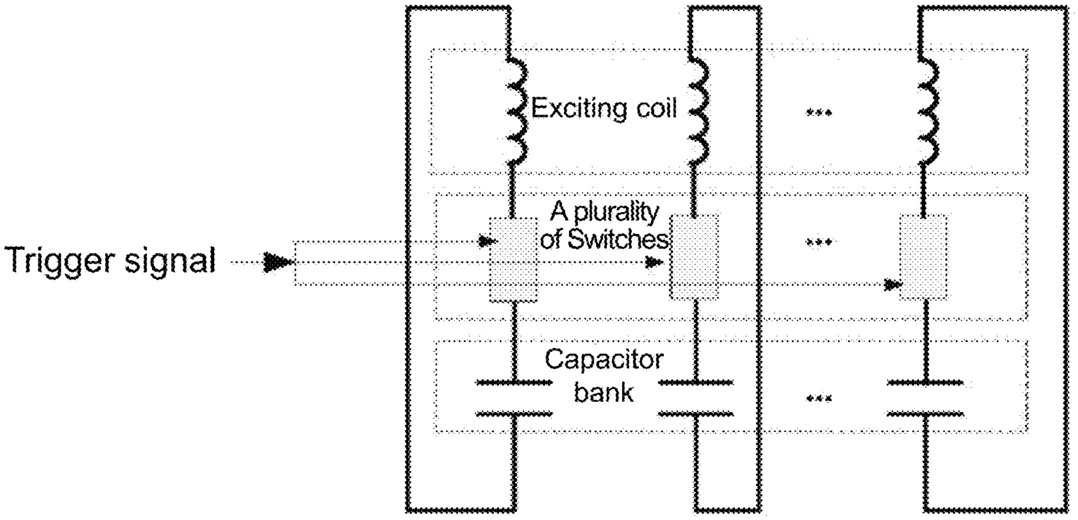
FIG. 7 is a circuit diagram of a pulse switch, an energy storage capacitor bank, and an exciting coil assembly for exciting an inductive pulse electromagnetic field in the third implemented structure of the inductive plasma acceleration apparatus according to an embodiment of the invention.

In such a structure, the inductive plasma acceleration apparatus works in the following process: the control assembly 5 emits a first control signal 61 to activate the pulse laser assembly 1, which emits a pulse laser 11, the pulse laser 11 of the linear configuration vertically penetrates through the lens 84 after passing the reflecting surface of the third reflecting mirror 83 and then vertically radiates the end of the solid-state working medium 4 to ablate the solid-state working medium 4 from the end, thereby producing a gaseous ablation product in the form of a pulse gas, and the pulse gas subsequently passes by a top opening of the tower 73 and the annular nozzle and then moves to a position, nearby the exciting coil assembly 3, where the pulse gas may be subjected to the action of the inductive pulse electromagnetic field, i.e., directly above the exciting coil assembly 3; at this point, the control assembly 5 emits a second control signal 62 to turn on the pulse switch 21, thereby turning on the loop consisting of the pulse switch 21, the energy-storage capacitor 22 that has been charged to a preset high voltage, and the exciting coil assembly 3, here, the pulse frequency of the pulse switch 21 is the same as that of the pulse laser assembly 1 for pulsed discharge; and the strong pulse current is produced by discharging and excited by the exciting coil assembly 3 to generate an inductive pulse electromagnetic field, which has a circumferential electric-field component breaking down the pulse gas to establish an annular plasma current, and has a radial magnetic-field component interacting with the plasma current to produce an axial Lorentz force to accelerate the plasmas, thereby achieving a propelling effect to complete one working pulse. Here, the average thrust and the average power may be adjusted by adjusting the working frequency of the pulse laser assembly 1 and the pulse switch 21. Here, a circuit diagram of the pulse switch 21, the energy-storage capacitor bank, and the exciting coil assembly 3 for exciting the inductive pulse electromagnetic field is as shown in FIG. 7.

Figure 8:
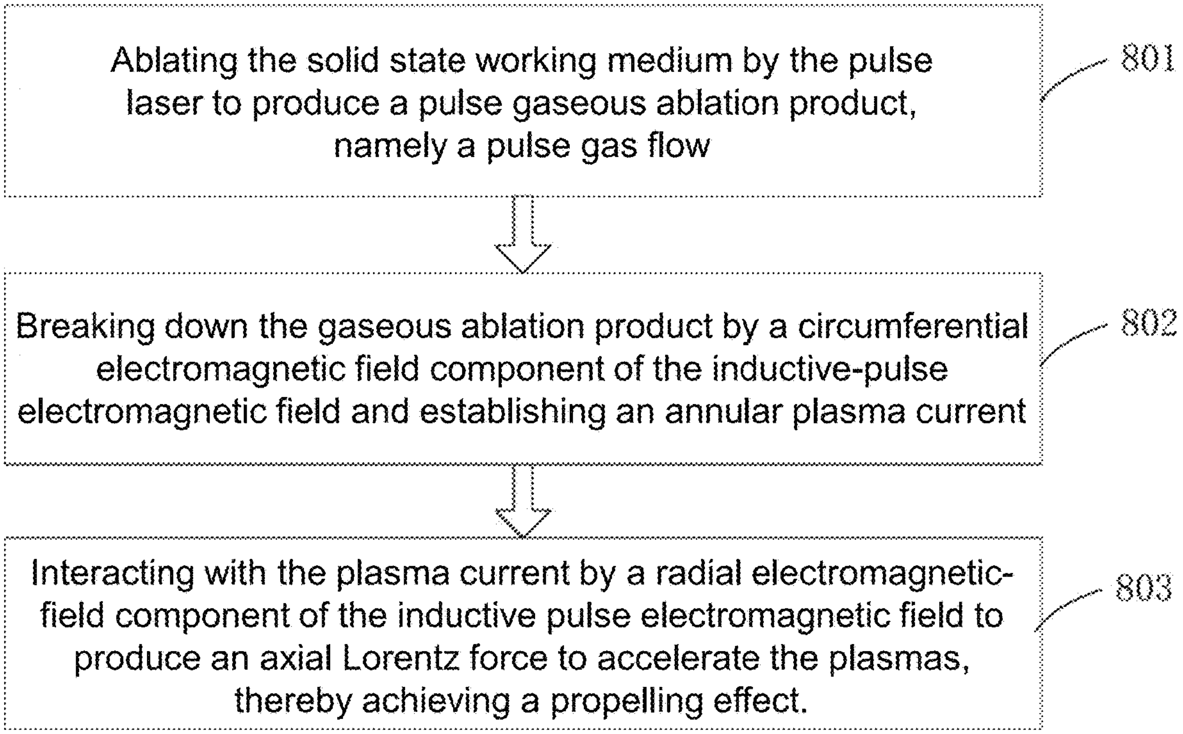
FIG. 8 is a schematic flowchart of an inductive plasma acceleration method according to an embodiment of the invention.

FIG. 8 shows an inductive plasma acceleration method using the inductive plasma acceleration apparatus according to this embodiment. The method specifically includes the following steps:

Step 801, ablating the solid-state working medium 4 by the pulse laser 11 to produce a pulse gaseous ablation product, namely a pulse gas flow;

Step 802, breaking down the gaseous ablation product by a circumferential electromagnetic-field component of the inductive pulse electromagnetic field and establishing an annular plasma current; and Step 803, interacting with the plasma current by a radial electromagnetic-field component of the inductive pulse electromagnetic field to produce an axial Lorentz force to accelerate the plasmas, thereby achieving a propelling effect.

Here, the yield and pulse frequency of the pulse gaseous ablation product is controlled by controlling the power and frequency of the pulse laser 11.

Described above are merely preferred embodiments of the invention, which are not intended to limit the patent scope of the invention. Within the inventive concept of the invention, any equivalent structure transformations made by using the contents of the Description and drawings of the invention, or their any direct or indirect applications to other relevant technical fields, shall be included within the patent scope of the invention.

What is claimed is:

1. An inductive plasma acceleration apparatus, comprising a pulsed laser assembly, a pulsed discharge assembly, an exciting coil assembly, a solid-state working medium, a control assembly, and a bracket, wherein the exciting coil assembly is electrically connected to the pulsed discharge assembly, such that the pulsed discharge assembly produces a strong pulse current in the exciting coil assembly during a discharge process to further excite an inductive pulse electromagnetic field around the exciting coil assembly;

the solid-state working medium is located on an optical path of a laser pulse emitted by the pulsed laser assembly, such that the solid-state working medium produces a gas pulse under an ablation action of the laser pulse, and the inductive pulse electromagnetic field is located on a circulation gas path of the gas pulse, such that the gas pulse is capable of entering the inductive pulse electromagnetic field;

and the pulsed laser assembly and the pulsed discharge assembly are both electrically connected to the control assembly to control a power and a frequency of the laser pulse emitted by the pulsed laser assembly, wherein a reflecting assembly capable of changing a direction of the optical path is disposed on the optical path of the laser pulse emitted by the pulsed laser assembly, such that the laser pulse is capable of accurately irradiating on the solid-state working medium based on a predetermined density distribution, wherein the reflecting assembly comprises a first reflecting mirror and a second reflecting mirror which are disposed on the bracket, the first reflecting mirror has an axisymmetric conical configuration, and the second reflecting mirror has an axisymmetric annular configuration;

the first reflecting mirror is located within an annular opening of the second reflecting mirror, a reflecting sheet of the first reflecting mirror is located on a conical surface of the axisymmetric conical configuration, and a reflecting surface of the second reflecting mirror is located on an inner-ring surface of the axisymmetric annular configuration;

the solid-state working medium and the exciting coil assembly are both disposed on the bracket and located between the reflecting surface of the first reflecting mirror and the reflecting surface of the second reflecting mirror, and the exciting coil assembly is located below the solid-state working medium and excites the inductive pulse electromagnetic field above the solid-state working medium; and the laser pulse emitted by the pulsed laser assembly irradiates on the solid-state working medium after reflecting from the reflecting surface of the first reflecting mirror and the reflecting surface of the second reflecting mirror.

2. The inductive plasma acceleration apparatus according to claim 1, wherein a generatrix of the first reflecting mirror and a generatrix of the second reflecting mirror are of a linear or curved configuration.

3. The inductive plasma acceleration apparatus according to claim 1, wherein the exciting coil assembly is formed by axisymmetrically crossing and overlapping a plurality of spiral line type antennas.

4. The inductive plasma acceleration apparatus according to claim 1, wherein the solid-state working medium is made of a high polymer material or a metal material.

5. An inductive plasma acceleration method using the inductive plasma acceleration apparatus according to claim 1, comprising the following steps:

ablating the solid-state working medium by the laser pulse to produce a pulse gaseous ablation product, namely a pulse gas flow;

breaking down the pulse gaseous ablation product by a circumferential electromagnetic-field component of the inductive pulse electromagnetic field and establishing an annular plasma current; and interacting with the plasma current by a radial electromagnetic-field component of the inductive pulse electromagnetic field to produce an axial Lorentz force to accelerate the plasma current, thereby achieving a propelling effect, wherein a yield and a pulse frequency of the pulse gaseous ablation product is controlled by controlling the power and the frequency of the laser pulse.

6. An inductive plasma acceleration apparatus, comprising a pulsed laser assembly, a pulsed discharge assembly, an exciting coil assembly, a solid-state working medium, a control assembly, and a bracket assembly, wherein the exciting coil assembly is electrically connected to the pulsed discharge assembly, such that the pulsed discharge assembly produces a strong pulse current in the exciting coil assembly during a discharge process to further excite an inductive pulse electromagnetic field around the exciting coil assembly;

the solid-state working medium is located on an optical path of a laser pulse emitted by the pulsed laser assembly, such that the solid-state working medium produces a gas pulse under an ablation action of the laser pulse, and the inductive pulse electromagnetic field is located on a circulation gas path of the gas pulse, such that the gas pulse is capable of entering the inductive pulse electromagnetic field; and the pulsed laser assembly and the pulsed discharge assembly are both electrically connected to the control assembly to control a power and a frequency of the laser pulse emitted by the pulsed laser assembly, wherein a reflecting assembly capable of changing a direction of the optical path is disposed on the optical path of the laser pulse emitted by the pulsed laser assembly, such that the laser pulse is capable of accurately irradiating on the solid-state working medium based on a predetermined density distribution, the bracket assembly comprises a support pedestal and a tower disposed on the support pedestal, the exciting coil assembly is disposed on the support pedestal and coiled around the tower;

the solid-state working medium has a columnar structure, wherein one end abuts on the support pedestal and another end located inside the tower, and an outer wall of a portion of the solid-state working medium located within the tower is in contact with and connected to an inner wall of the tower;

the reflecting assembly comprises a reflecting pedestal suspended above the tower, as well as a third reflecting mirror and a lens which are disposed on the reflecting pedestal, the third reflecting mirror is located above the lens and has a reflecting surface facing towards the lens, an annular skirt extending downwards is disposed around the lens, the lens is located directly above the tower and faces towards an end of the solid-state working medium, and an annular nozzle facing towards the exciting coil assembly is defined between an inner wall of the annular skirt and an outer wall of the tower; and the laser pulse emitted by the pulsed laser assembly irradiates on the end of the solid-state working medium after passing the reflecting surface of the third reflecting mirror and the lens.

7. The inductive plasma acceleration apparatus according to claim 6, wherein the support pedestal is provided with a restraint member having an annular structure, and the exciting coil assembly is located between an inner wall of the restraint member and the outer wall of the tower.

8. The inductive plasma acceleration apparatus according to claim 6, wherein the support pedestal is provided with a support spring at a position corresponding to the solid-state working medium, and the end of the solid-state working medium abuts on the support spring.

9. An inductive plasma acceleration method using the inductive plasma acceleration apparatus according to claim 6, comprising the following steps:

ablating the solid-state working medium by the laser pulse to produce a pulse gaseous ablation product, namely a pulse gas flow;

breaking down the pulse gaseous ablation product by a circumferential electromagnetic-field component of the inductive pulse electromagnetic field and establishing an annular plasma current; and interacting with the plasma current by a radial electromagnetic-field component of the inductive pulse electromagnetic field to produce an axial Lorentz force to accelerate the plasma current, thereby achieving a propelling effect, wherein a yield and a pulse frequency of the pulse gaseous ablation product is controlled by controlling the power and the frequency of the laser pulse.

* * * * *